US006321206B1

(12) United States Patent
Honarvar

(10) Patent No.: US 6,321,206 B1
(45) Date of Patent: Nov. 20, 2001

(54) DECISION MANAGEMENT SYSTEM FOR CREATING STRATEGIES TO CONTROL MOVEMENT OF CLIENTS ACROSS CATEGORIES

(75) Inventor: Laurence Honarvar, Arnold, MD (US)

(73) Assignee: American Management Systems, Inc., Fairfax, VA (US)

( * ) Notice: Subject to any disclaimer, the term of this patent is extended or adjusted under 35 U.S.C. 154(b) by 0 days.

(21) Appl. No.: 09/217,017

(22) Filed: Dec. 21, 1998

Related U.S. Application Data

(60) Provisional application No. 60/076,910, filed on Mar. 5, 1998.

(51) Int. Cl.$^7$ ..................................................... G06F 17/60
(52) U.S. Cl. ................................................. 705/7; 705/10
(58) Field of Search .......................................... 705/7, 10

(56) References Cited

U.S. PATENT DOCUMENTS

| | | | | |
|---|---|---|---|---|
| 5,819,263 | * | 10/1998 | Bromley et al. | 707/3 |
| 5,875,431 | * | 2/1999 | Heckman et al. | 705/7 |
| 5,930,762 | * | 7/1999 | Hasch | 705/7 |
| 5,930,764 | * | 7/1999 | Melchione et al. | 705/10 |
| 5,963,910 | * | 10/1999 | Ulwick | 705/7 |

FOREIGN PATENT DOCUMENTS

1390397 * 8/1972 (GB).

OTHER PUBLICATIONS

Hagerty, Michael, "A powerful tool for diagnosis and strategy," Journal of Management Consulting, v9, n4, Nov. 1997, 11 pages.*

Chambers, David, "Setting your sights on the customer," Bank Marketing, v25, n2, Feb. 1993, 9 pages.*

Stuchfield, Nicholas and Weber, Bruce W., "Modeling the Profitability of Customer Relationships: Development and Impact of Barclays de Zoete Wedd's BEATRICE", Journal of Management Information Systems, vol. 9, No. 2, Fall 1992, pp. 53–76.*

Hettler, Mark, "NSTL Report: OLAP Comparison", Computing Canada, Jan. 20, 1997, pp. 16–17.*

Kettinger et al, "Strategic Information Systems Revisited: A Study in Sustainability and Performance", MIS Quarterly, vol. 18, No. 1, Mar. 1994, pp. 31–58.*

Vitale et al, "New Process/Financial Scorecard: A strategic Performance Measurement System", Planning Review, vol. 22, No. 4, Jul.–Aug., 1994, p. 12(6).*

Spencer, Tricia and Blahuta, Donnelle, "The Business Value of Data Warehousing", Enterprise Systems Journal, vol. 12, No. 6, Jun. 1997, p. 40(4).*

Rudin, Ken, "What's New in Data Warehousing: A snapshot View of Where the Data Warehouse Market is Now and Where it's Going", DBMS Data Warehouse Supplement. Aug. 1996, pp. S4–s8 and S28.*

* cited by examiner

*Primary Examiner*—Tariq R. Hafiz
*Assistant Examiner*—Marc Norman
(74) *Attorney, Agent, or Firm*—Staas & Halsey LLP

(57) ABSTRACT

A software-based decision management system that allows an organization to monitor and evaluate client performance data relating to client interactions with the organization, and to appropriately modify organizational strategies in accordance with the performance data. More specifically, the system (a) applies different strategies to different categories of clients of the organization, (b) tracks the performance of the clients as a result of the applied strategies, and (c) refines the applied strategies based on the tracked performance to increase client value over time to the organization. For example, in a specific embodiment, clients are assigned into categories and test groups to define a data structure conceptually representable as a matrix having first and second axes with the categories on the first axis and the test groups on the second axis, the intersection of each category and test group in the matrix defining a test cell. Different strategies are applied to clients within different test cells. The movement of clients is tracked between categories as a result of the applied strategies. The applied strategies are then refined based on the tracked movement.

23 Claims, 16 Drawing Sheets

| | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

|  | BRONZE | GOLD | PLATINUM |
|---|---|---|---|
| TEST GROUP 1 | STRATEGY TEST CELL 1 | STRATEGY TEST CELL 2 | STRATEGY TEST CELL 3 |
| TEST GROUP 2 | STRATEGY TEST CELL 4 | STRATEGY TEST CELL 5 | STRATEGY TEST CELL 6 |
| TEST GROUP 3 | STRATEGY TEST CELL 7 | STRATEGY TEST CELL 8 | STRATEGY TEST CELL 9 |

FIG. 9

| | DIMENSIONS | | | | | METRICS | | | |
|---|---|---|---|---|---|---|---|---|---|
| OBSERVATION TIME | PERFORMANCE TIME | SEGMENT | TEST GROUP | CATEGORY | REPORT GROUP | DELQ | % CREDIT LINE USED | VALUE | PROFIT |
| 1/98 | 1/98 - 6/98 | 1 | 1 | BRONZE | A | # | # | # | # |
| 1/98 | 1/98 - 6/98 | 1 | 1 | BRONZE | B | # | # | # | # |
| 1/98 | 1/98 - 6/98 | 1 | 1 | BRONZE | C | # | # | # | # |
| 1/98 | 1/98 - 6/98 | 4 | 2 | GOLD | F | # | # | # | # |

ACCUMULATED PERFORMANCE DATA

FIG. 12

| DATE | TEST | DESCRIPTION |
|---|---|---|
| 1/98 ··· 6/98 | T1 | TEST 1 |
| 1/98 ··· 6/98 | T2 | TEST 2 |
| 2/98 ··· 3/98 | T3 | TEST 3 |
| 3/98 ··· 9/98 | T4 | TEST 4 |
| 4/98 ··· 10/98 | T5 | TEST 5 |

FIG. 13

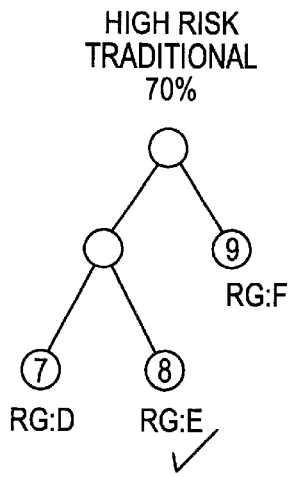
FIG. 14A
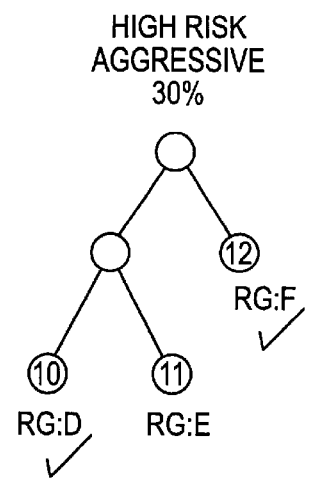
FIG. 14B
|  | HIGH RISK | MED RISK | LOW RISK |
|---|---|---|---|
| TRADITIONAL (70%) | 16 | 38 | 16 |
| AGGRESSIVE (30%) | 5 | 20 | 5 |
FIG. 14C
|  | HIGH RISK | MED RISK | LOW RISK |
|---|---|---|---|
| TRADITIONAL (70%) | 8 | 38 | 24 |
| AGGRESSIVE (30%) | 2 | 22 | 6 |
FIG. 14D

DECISION MANAGEMENT SYSTEM FOR CREATING STRATEGIES TO CONTROL MOVEMENT OF CLIENTS ACROSS CATEGORIES

CROSS REFERENCE TO RELATED APPLICATION

This application claims priority to provisional application 60/076,910, filed Mar. 5, 1998, and which is incorporated herein by reference.

This application is related to U.S. application titled SIMULTANEOUS CUSTOMER/ACCOUNT STRATEGY EXECUTION IN A DECISION MANAGEMENT SYSTEM, inventor Laurence Honarvar, Ser. No. 09/216,985, filed concurrently herewith, and which is incorporated herein by reference.

This application is related to U.S. application titled USE OF ONLINE ANALYTICAL PROCESSING (OLAP) IN A RULES BASED DECISION MANAGEMENT SYSTEM, inventors Steve Campbell, Laurence Honarvar and Traci Showalter, Ser. No. 09/217,016, filed concurrently herewith, and which is incorporated herein by reference.

BACKGROUND OF THE INVENTION

1. Field of the Invention

The present invention relates to a decision management system for creating strategies to manage clients, such as customers, accounts, or applicants, of an organization. More specifically, the present invention relates to a decision management system for creating strategies to control movement of clients across different client categories.

2. Description of the Related Art

A typical organization maintains a significant amount of information about its clients, where clients refer to the customers, accounts or applicants for services of the organization. This information can be effectively used, for example, to increase productivity and reduce costs, while achieving the goals of the organization. Such goals may be to improve profitability and maximize customer value.

For example, a company may sell various products to its customers, and may maintain a significant amount of information relating to its customers. This information can be used to improve many critical interactions with the customers, such as marketing communications, sales calls, customer service, collections, and general relationship management activities.

Consider the following examples.

Assume that a diversified financial services company is trying to leverage its customer base by cross-selling its various products. It currently uses limited internal customer information and credit bureau information to identify existing customers for cross-sell campaigns. For example, they might send "invitations to apply" for a home equity loan to those customers who own a mortgage with the company, and meet a minmum credit bureau score threshold. Imagine how much more powerful their cross-selling efforts would be if they could use information from all of the customers' accounts to offer pre-approved home equity loans to customers where the likelihood of a sale was high, the probability of default was low, and the financial value of that sale was high.

As another example, assume that a regional bell operating company is currently applying only age-based criteria (e.g., "days past due") to its accounts receivable portfolio to identify candidates for its collections department and to handle those customers. The content of the outbound collection notices and phone calls is driven solely by the age and amount of a customer's unpaid balance. Imagine if the company had a tool that helped it select and prioritize collection accounts based on the likelihood of a customer interaction making a bottom line difference. Instead of calling or writing all overdue accounts, they could focus resources on those where the customer interaction would make the greatest difference. In addition, they would save the expense and ill will generated by calling customers who would pay without a collections contact.

As a still further example, assume that a manager of a large telephone customer service center for a super-regional bank has been given only hard-line corporate policy to make decisions about fee and rate concessions. While her service reps attempt to stay to the company line, she is deluged with requests from good customers to talk to the manager. She uses her judgment based on the incomplete information available to her to decide which concessions are appropriate to prevent attrition of profitable customers. Just imagine if the service reps had guidelines that were specific to each customer, based upon customer data that indicates their value to the organization, likelihood of attrition, risk level, and other characteristics. The manger could stand by these guidelines with confidence. There would be no concessions made to unprofitable customers, fewer manager overrides, shorter calls, and reduced attrition of the customers they want to keep.

As diverse as the above examples appear on the surface, they share several common characteristics. Each involves a large customer base and a high volume of customer interactions. Each organization has a substantial amount of accumulated data regarding the characteristics, purchasing/behavior patterns, and profitability of customers (though the data may not yet be well organized or analyzed). Each organization has an opportunity to improve performance substantially by treating different customers and customer groups differently, due to diversity in customer relationships and their potential. In each case, there are desired outcomes that could result from alternative customer interactions (e.g., customer purchases a product, pays an outstanding bill, increases deposit balances), and those outcomes can readily be identified, quantified, and tracked.

Therefore, each of the above examples depicts a business situation that currently is not fully benefiting from decision support and therefore is yielding less than optimal results.

There are software based products in the marketplace which can organize information to make more effective decisions. For example, the American Management Systems (AMS) Strata™ decision support system release 2.0 (hereinafter Strata™ release 2.0) is a software based system which applies predictive modeling techniques to customer data, to thereby generate dramatic improvements in the effectiveness and profitability of customer interactions.

FIG. 1 is a diagram illustrating the general concept of a software-based decision management system, such as Strata™ release 2.0, which applies predictive modeling techniques to customer data.

Referring now to FIG. 1, a software based system 10 receives information from operational and/or customer information systems 20, such as, for example, billing systems, account management systems, credit bureau systems and data warehouses. Software based system 10 prioritizes and tailors customer interactions based on predictive information, specific business rules, and continually evolving decision strategies. Software based system 10 then determines an appropriate action which is to be taken by an action-taking system 30. An appropriate action to be taken could include, for example, a call to a customer, a specific collections procedure or a specific marketing action.

A decision management system as in FIG. 1 can provide superior results, such as increased revenue generation, improved cost-effectiveness and enhanced customer relationships.

FIG. 2 is a more detailed diagram illustrating the operation of the decision management system Strata™ release 2.0.

Referring now to FIG. 2, in step 40, an inbound event is a trigger that is received from one or more external systems to identify that a particular client event has occurred. Such events may be automatically generated due to client behavior or systematically produced at specified time intervals (i.e., monthly). Examples of inbound events include a customer declaring bankruptcy, a credit underwriting decision request, a credit account delinquency, an income statement cycle date, or a routine evaluation date (a periodic, scheduled evaluation).

From step 40, the system moves to step 50, where a client is assigned to a segment. A segment is a grouping of clients based on a characteristic by which the clients will be separated for applying different rules. Generally, a segment is a high level segregation of clients for the purpose of associating largely independent high level strategy. Segments are completely separate groups of clients, for which a unique set of evaluation processes have been defined. For example, a telecommunications company might have a segment for residential customers and another for business customers.

From step 50, the system moves to step 60, where clients are randomly grouped into different test groups for the purpose of applying competing policy rules, strategy, or experiments. Generally, test groups allow for strategy comparison. Just as in research environments, the behavior or outcomes of an experimental "test" population is compared to that of a "control" group that is not exposed to the experimental treatment. A strategist can specify what percentage of the clients should be randomly assigned to each test group. If the strategy associated with a test group is successful, that strategy may later be deployed to a larger percentage of the clients.

From step 60, the system moves to step 70, where inbound events are matched to processes. More specifically, it is defined which processes are invoked in response to each inbound event. For example, different processes are created for a credit card campaign versus a late payment. The order of process execution is also specified.

Processes can be seen as individual decision logic modules which are invoked in response to inbound events. This modular approach to defining decision strategies facilitates logic re-use and the ability to deploy robust strategies required to coordinate customer, account and marketing decisions.

From step 70, the system moves to step 80, where the specific processes for inbound events coming into the system are executed.

From step 80, the system moves to step 90, where the results, or action to be taken, are output.

Therefore, in FIG. 2, based on the type of inbound event(s) received, an appropriate sequence of decision logic modules, or processes, is invoked, where the sequence of decision logic modules is predefined by a strategy analyst.

FIG. 3 is a diagram illustrating an example of a segment being divided into different test groups as in step 60 of FIG. 2. Referring now to FIG. 3, 10% of the segment is randomly assigned to test group 1, 10% of the segment is randomly assigned to test group 2, and 80% of the segment is randomly assigned to test group 3.

FIGS. 4(A) and 4(B) are diagrams illustrating the matching of inbound events to processes in step 70 of FIG. 2. Referring now to FIG. 4(A), for example, when an inbound event 91 is a credit card campaign, the following processes are applied, in order: credit card propensity to buy score 92, risk score 93 and offer selection 94. A result 95 of the applied processes is a determination of whether to send a credit card offer.

Similarly, referring now to FIG. 4(B), for example, when an inbound event 96 is a late payment, the following processes are applied, in order: risk score 97, underwriting treatment 98 and overdraft decision treatment 99. A result 100 of the applied processes is a determination whether to send new underwriting and overdraft codes.

Processes are decision logic modules formed by one or more "mechanisms". Mechanisms can be, for example, decision trees or score models. There are preferably several different mechanisms which are available in the creation of any process. One or more mechanisms are typically grouped into processes when they have comparable objectives (i.e., score cards to predict risk, decision trees to evaluate a credit line, etc.). Generally, the objective is typically reflected in the name of the process itself as defined by the user.

In this conventional decision management system, only a single set of variables is defined. This single set of variables is written over and used for each process. Subsequent processes write over the data stored in the variables from the previous process. For example, referring to FIG. 4A, once a risk score is computed by risk score 93, this risk score is stored into a variable which may have stored a score computed by the credit card propensity to buy score 92. Thus, the results of the processes are written over each other into the same set of variables. In this manner, the decision management system has a forced dependency between processes.

FIG. 5 is a diagram illustrating the grouping of mechanisms to processes. Referring now to FIG. 5, when an inbound event 91 triggers a specific process, the specific mechanism to be applied to a client will be determined by the test group into which the client was assigned. This allows for strategy experimentation by defining a common sequence of processes for a given inbound event, but differentiating the actual mechanism that will be invoked for each process depending on the respective test group into which the client was randomly assigned.

If a process only contains one mechanism, no experimentation will take place in that process since every client, regardless of its test group, will be required to use the mechanism. For example, in FIG. 5, no experimentation takes place in the credit card propensity to buy score 92, since this process contains only one mechanism. By contrast, in FIG. 5, experimentation takes place in offer selection 94, since this process includes more than one mechanism. This approach provides the strategy analyst with the flexibility to selectively experiment on each component of the overall strategy, as appropriate.

Processes can include many different types of mechanisms, including decision trees, score models and matrices. Decision trees are the most common.

FIG. 6 is a diagram illustrating a decision tree. A decision tree employs pre-defined logic to route clients to the appropriate endpoint. Generally, a decision tree contains layers of rule-driven decision points, or nodes (starting with a root node at the top of the tree), from which clients are allocated to lower and lower branches of a tree until they ultimately reach an endpoint of the tree (a terminal node). Because decision trees can vary in structure (e.g., number of branches, nodes per branch) and because decision trees can call other decision trees, decision trees provide extensive flexibility for designing client strategies.

The above-described decision management system can allow hybrid strategies to be developed, based on the success of different experiments.

For example, FIG. 7 is a diagram illustrating the effectiveness of creating a hybrid strategy in a decision management system, such as Strata™ release 2.0.

Referring now to FIG. 7, a "test" strategy is applied to test group A, where customers in test group A are divided into two groups, TGA1 and TGA2. Group TGA1 includes all customers less than 40 years old. Group TGA2 includes all customers greater than or equal to 40 years old. A letter is sent to customers whether they are in group TGA1 or TGA2. The end result is that a letter is 60% effective for the customers in TGA1, and 70% effective for customers in TGA2. Assuming that 50% of the population is greater than or equal to 40 years old, and 50% of the population is less than 40 years old, the overall success rate of the test strategy is 65%.

Similarly, a "control" strategy is applied to test group B, where customers in test group B are divided into two groups, TGB1 and TGB2. Group TGB1 includes all customers less than 40 years old. Group TGB2 includes all customers greater than or equal to 40 years old. A call is made to customers whether they are in group TGB1 or TGB2. The end result is that a call is 50% effective for the customers in TGB1, and 90% effective for customers in TGB2. Assuming that 50% of the population is greater than or equal to 40 years old, and 50% of the population is less than 40 years old, the overall success rate of the control strategy is 70%.

An overall comparison of results of test group A (the "test" strategy) versus test group B (the "control" group) indicates that the control strategy is superior, as measured by overall success rate. However, when strategy effectiveness is reported at the comparable path level through the test and control strategies, it is possible to build a new hybrid strategy that will outperform either the test strategy or the control strategy by combining the best performing actions of each strategy. For example, the hybrid strategy would send a letter to all customers less than 40 years old, but call all customers greater than or equal to 40 years old. Such a hybrid strategy should produce an expected overall success rate of 75%, which is higher than either of the test or control strategies.

Such an approach for determining a hybrid strategy could be used, for example, to improve the strategy in offer selection 94 in FIG. 5, where different strategies are applied to different test groups. The formation of a hybrid strategy can significantly increase the effectiveness and profitability of an organization.

Unfortunately, the above-described decision management system has been limited for use with customers in the same category, where a category is a grouping of clients based on how the organization views the clients.

For example, a credit card company may divide customers into the categories of Silver, Gold and Platinum based on characteristics of the customers. The above-described decision management system will only be effective for optimizing strategy for a specific category of customers, such as, for example, Gold customers, and only within each process.

Moreover, the above-described decision management system will not provide a mechanism for monitoring performance and developing strategies which effectively move customers from one category to another. For example, the decision management system will not allow a credit card company to monitor performance and effectively develop strategies to move customers from the Silver category to the Gold category.

SUMMARY OF THE INVENTION

Therefore, it is an object of the present invention to provide a decision management system which allows strategies and experiments to be developed which encourage and track movement of clients of an organization from one category of clients to another, or simply increase client value over time to the organization.

In addition, it is an object of the present invention to provide a comprehensive decision management system that facilitates client management across an organization through the informed definition of predictive methods, associated strategies, and subsequent performance monitoring and analysis.

Further, it is an object of the present invention to provide a decision management system which provides efficient and robust strategy determinations resulting in actions executed by client contact or target systems, and develops and evaluates controlled experiments to continuously optimize decision strategies.

Additional objects and advantages of the invention will be set forth in part in the description which follows, and, in part, will be obvious from the description, or may be learned by practice of the invention.

Objects of the present invention are achieved by providing a decision management method and apparatus which (a) applies different strategies to different categories of clients of an organization, and (b) refines the applied strategies to increase client value over time to the organization.

Objects of the present invention are also achieved by providing a decision management method and apparatus which, in part or in totality, (a) assigns clients of an organization into categories and test groups to conceptually represent a data structure equivalent to a matrix having first and second axes with the categories on the first axis and the test groups on the second axis, the intersection of each category and test group in the matrix defining a test cell; (b) applies different strategies to clients within different test cells, strategies being based on decision tree structures and, for a respective test group, strategies having the same decision tree structure being applied to clients in the test cells for that test group across each category; (c) tags paths through decision tree structures with tags that measure performance of the tagged path and that span test groups so that paths through different strategies applied to clients within different test cells for different test groups can be compared; (d) monitors the tagged paths via the tags to track the performance of clients that travelled the tagged paths; (e) tracks the performance of a category as the cumulative performance of the clients that travelled the tagged paths in that category; and (f) refines strategies applied to clients in individual test cells based on the tracked performance, to control the movement of clients between categories.

BRIEF DESCRIPTION OF THE DRAWINGS

Reference will now be made in detail to the present preferred embodiments of the present invention, examples of which are illustrated in the accompanying drawings, wherein like reference numerals refer to like elements throughout.

FIG. 9 is a diagram illustrating a matrix created in a decision management system, for analyzing data and applying strategies, according to an embodiment of the present invention.

FIG. 12 is a diagram illustrating an example of a row of data having a dimensions part and metrics part, according to an embodiment of the present invention.

FIG. 13 is a diagram illustrating a look-up table for a dimension in the row illustrated in FIG. 12, according to an embodiment of the present invention.

FIGS. 14(A), 14(B), 14(C) and 14(D) are diagrams illustrating the operation of a decision management system, according to an embodiment of the present invention.

DESCRIPTION OF THE PREFERRED EMBODIMENTS

Figure 8:
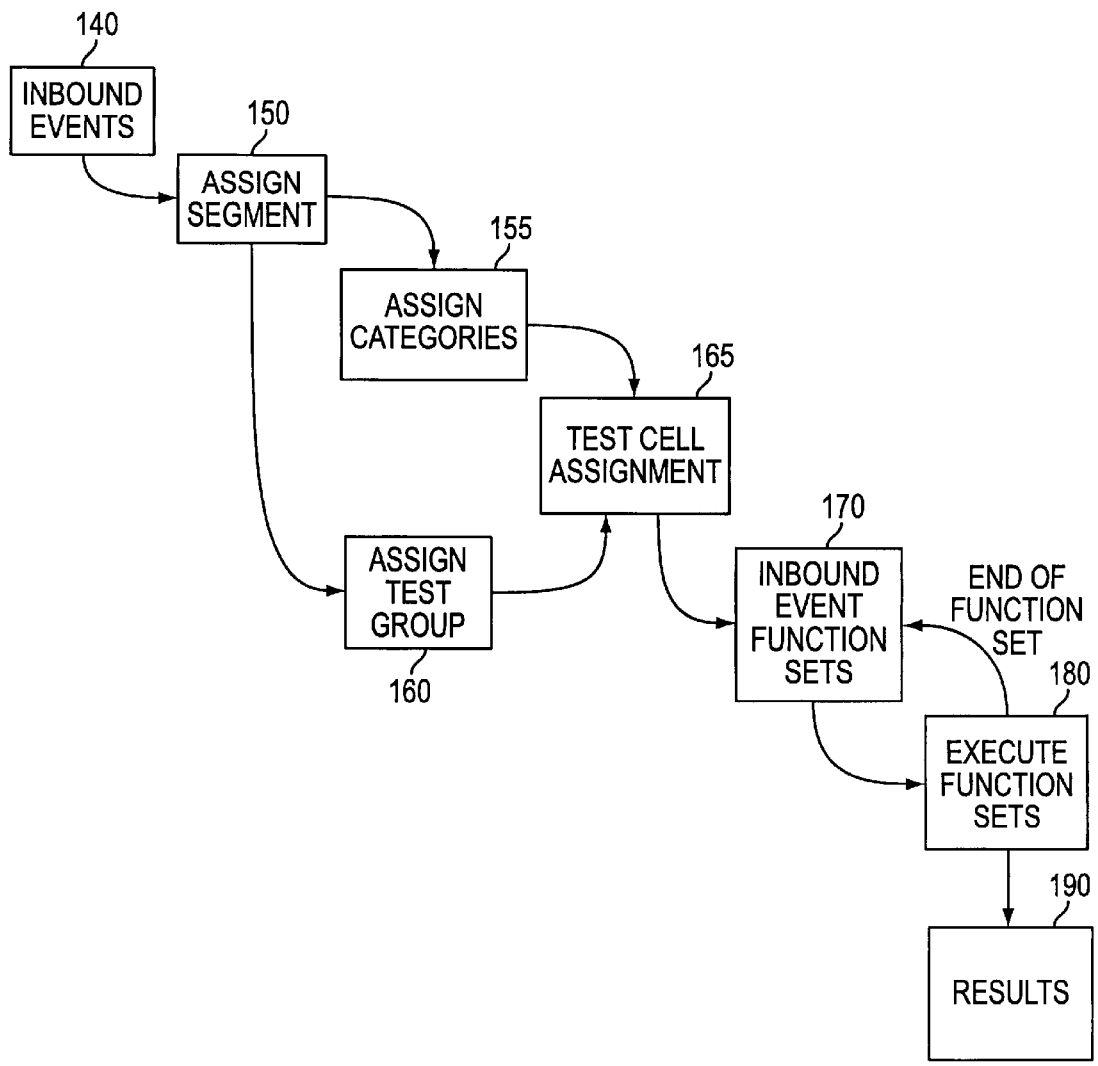
FIG. 8 is a diagram illustrating the functional flow of a decision management system, according to an embodiment of the present invention.

FIG. 8 is a diagram illustrating the functional flow of a decision management system, according to an embodiment of the present invention. Referring now to FIG. 8, in step 140, an inbound event is a trigger that is received from one or more external systems to identify that a particular client event has occurred. Here, a client refers to people or entities which interact with, or do business with, an organization. For example, clients include customers, accounts or applicants for services of the organization.

From step 140, the system moves to step 150, where clients are assigned to different segments. A segment is a grouping of clients based on a characteristic by which the clients will be separated for applying different rules. Generally, a segment is a high-level segregation of clients for the purpose of associating largely independent high-level strategy. Thus, segments are separate groups of clients, for which a unique set of evaluation procedures have been defined. For example, a telecommunications company might have a segment for residential customers and another for business customers. Each segment can have, for example, a separate manager who is the only one with security rights to setup or modify the evaluation procedure for that segment.

From step 150, the system moves to step 155, where each segment is further divided into categories. A category is a grouping of clients as defined by the organization such that it aligns client interaction/value management objectives. In other words, categories represent groups of clients based on how the organization views the clients. For example, a bank may divide clients (such as credit card holders) into the categories of Bronze, Gold, and Platinum, based on how the bank views the credit worthiness of the clients.

From step 150, the system also moves to step 160, where clients are grouped in a random manner into different test groups for the purpose of applying competing policy rules, strategy, or experiments. Thus, steps 155 and 160 can be seen as being performed in parallel.

After steps 155 and 160, each segment has now been divided into test groups and categories. Categories and test groups can be considered to be at the same level in the strategy hierarchy.

From steps 155 and 160, the system moves to step 165, where a matrix is created for each segment, with the categories and test groups on different axes, to create a strategy test cell at the intersection of each category and test group. Here, it is not necessary that a matrix be "physically" created. Instead, the data must simply be organized or arranged in some manner that allows clients to be conceptually represented in a data structure equivalent to a matrix, so that clients can be associated with, or assigned to, strategy test cells.

Figure 1:
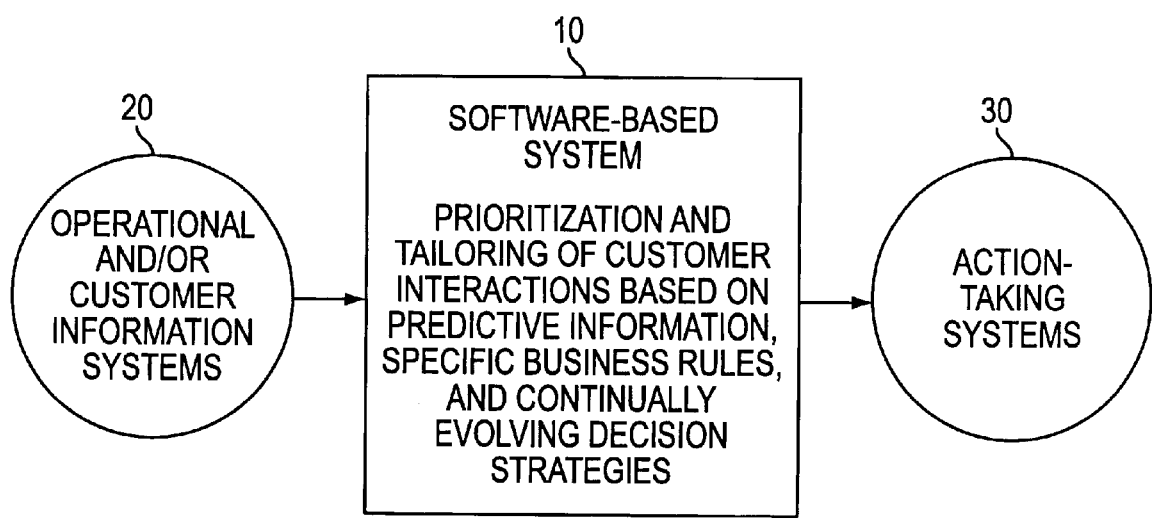
FIG. 1 (prior art) is a diagram illustrating the general concept of a software-based decision management system which applies predictive modeling techniques to customer data.
Figure 2:
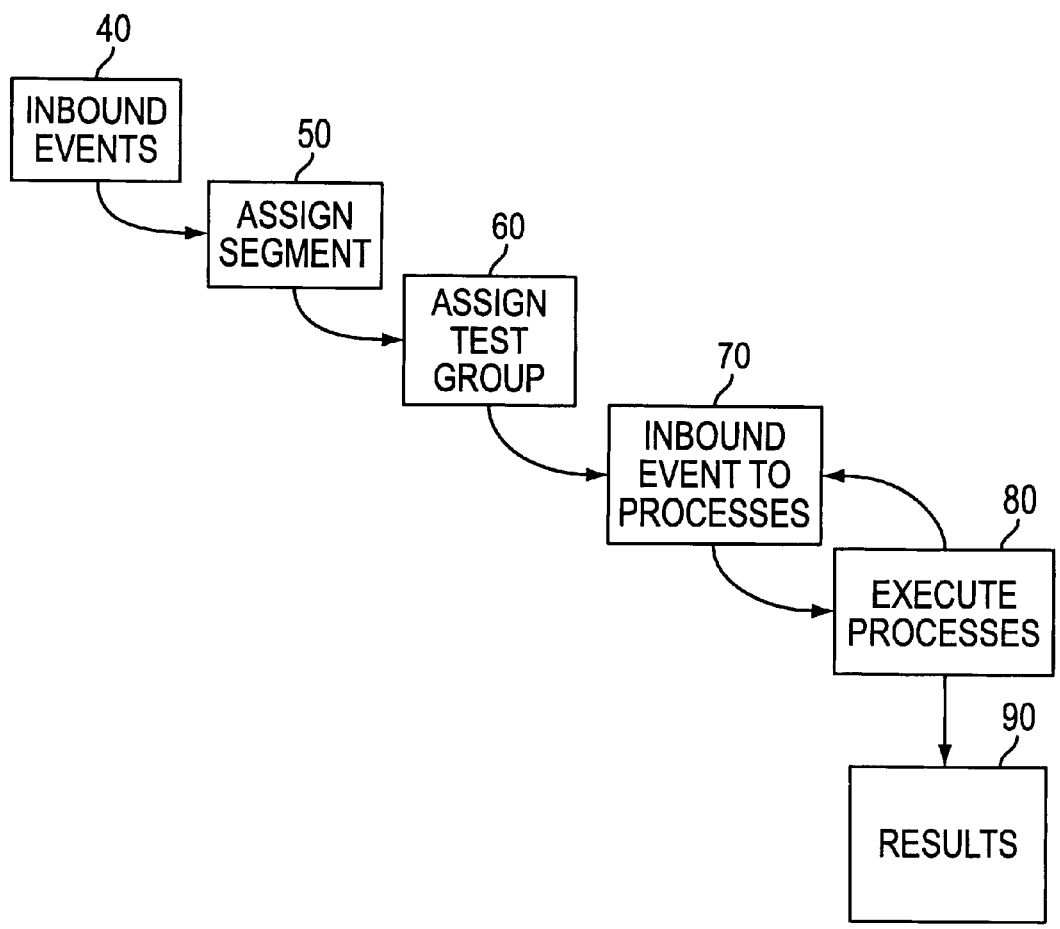
FIG. 2 (prior art) is a more detailed diagram illustrating the operation of a decision management system.
Figure 3:
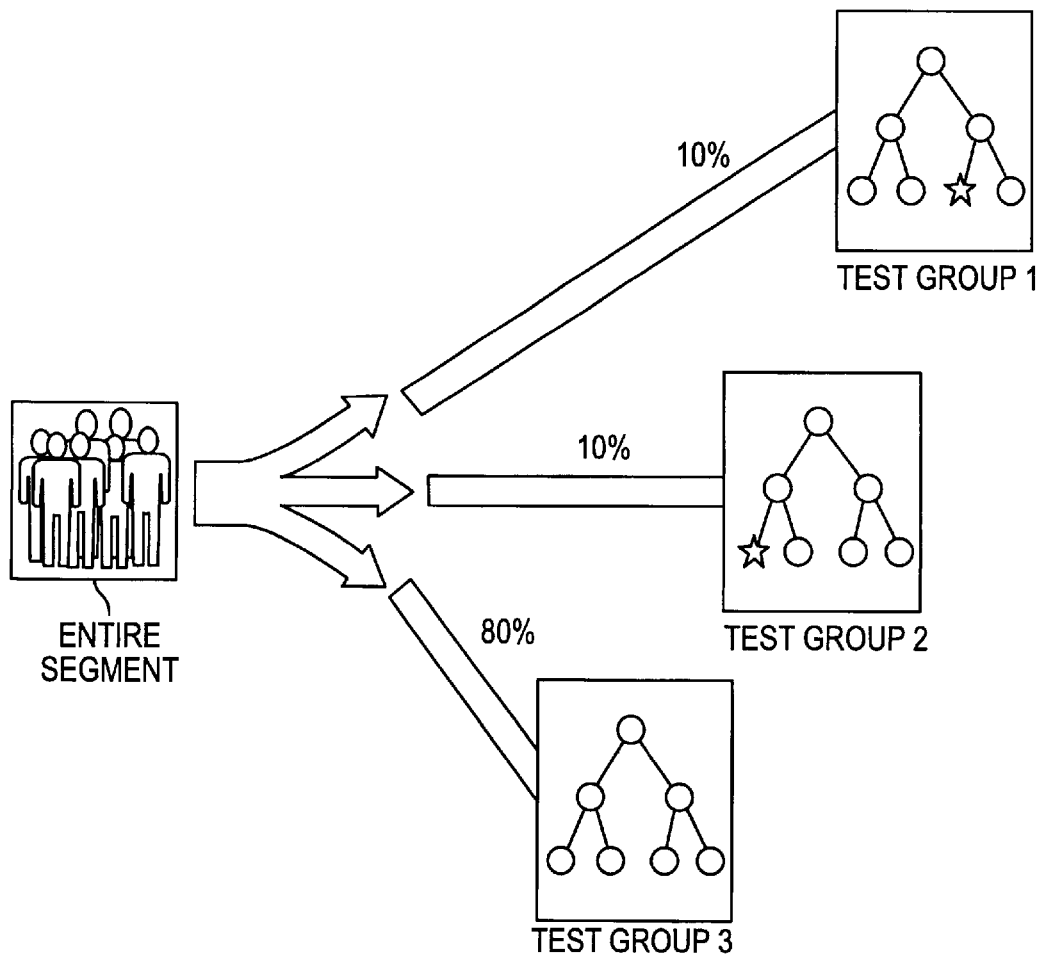
FIG. 3 (prior art) is a diagram illustrating an example of a segment being divided into different test groups in a decision management system.
Figures 4A, 4B:
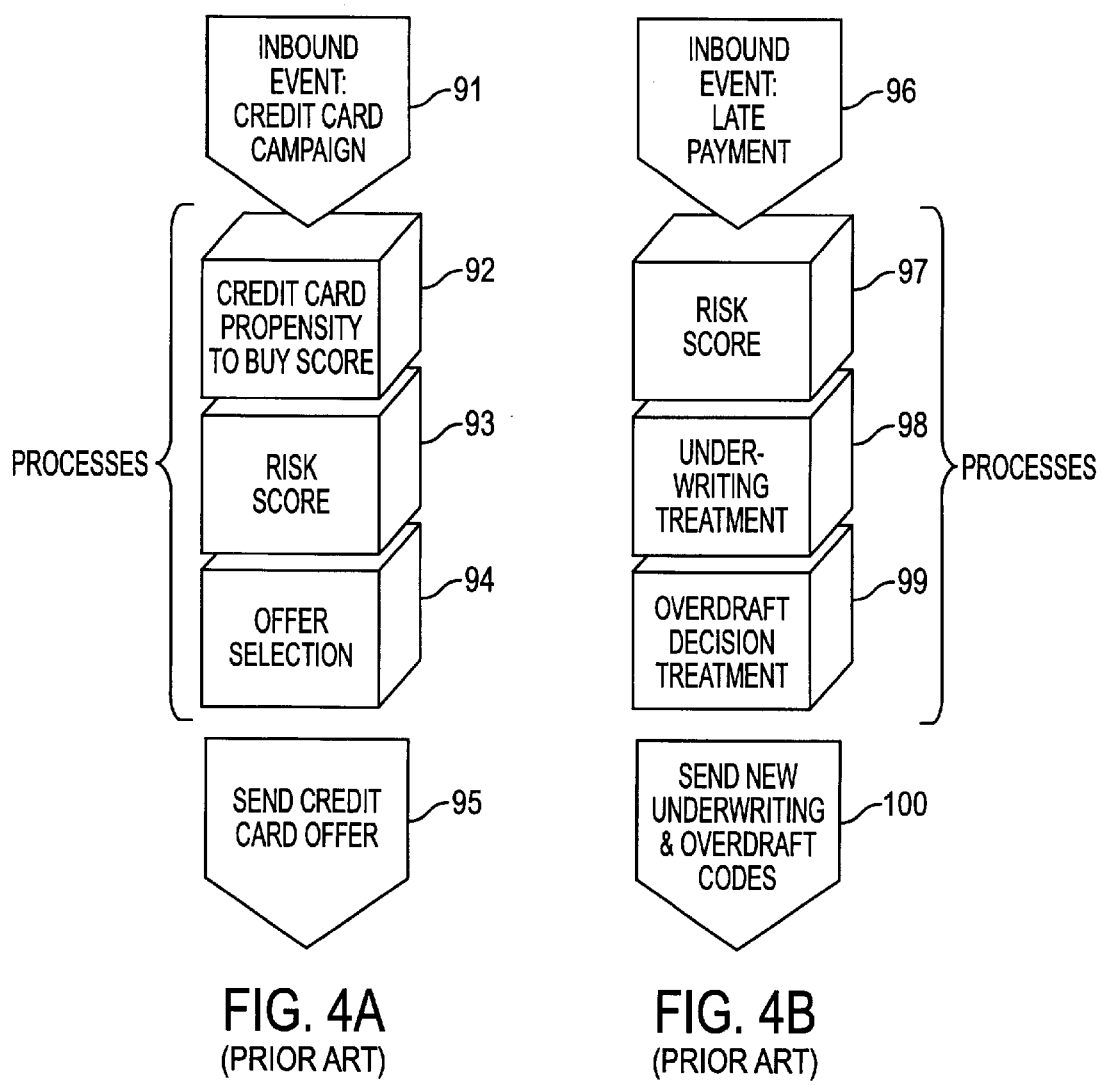
FIGS. 4(A) and 4(B) (prior art) are diagrams illustrating the matching of inbound events to processes in a decision management system.

From step 165 the system moves to step 170, where inbound events are matched to function sets. Here, a function set has a similar meaning as a "process" described, for example, in FIGS. 4(A) and 4(B), but the present invention uses a different terminology.

From step 170, the system moves to step 180, where the specific function sets for one or more specific inbound events are executed.

From step 180, the system moves to step 190, where the results, or action items, are output.

FIG. 9 is a diagram illustrating the creation of a matrix of the categories and test groups for a respective segment, as in step 165 of FIG. 8, according to an embodiment of the present invention. Referring now to FIG. 9, categories of, for example, Bronze, Gold and Platinum are on one axis of the matrix, and test groups 1, 2 and 3 are on the other axis of the matrix. The intersection of a respective category with a respective test group represents a strategy test cell of the matrix.

Then, possibly for each function set, different strategies are designed for different strategy test cells of the matrix.

Figure 5:
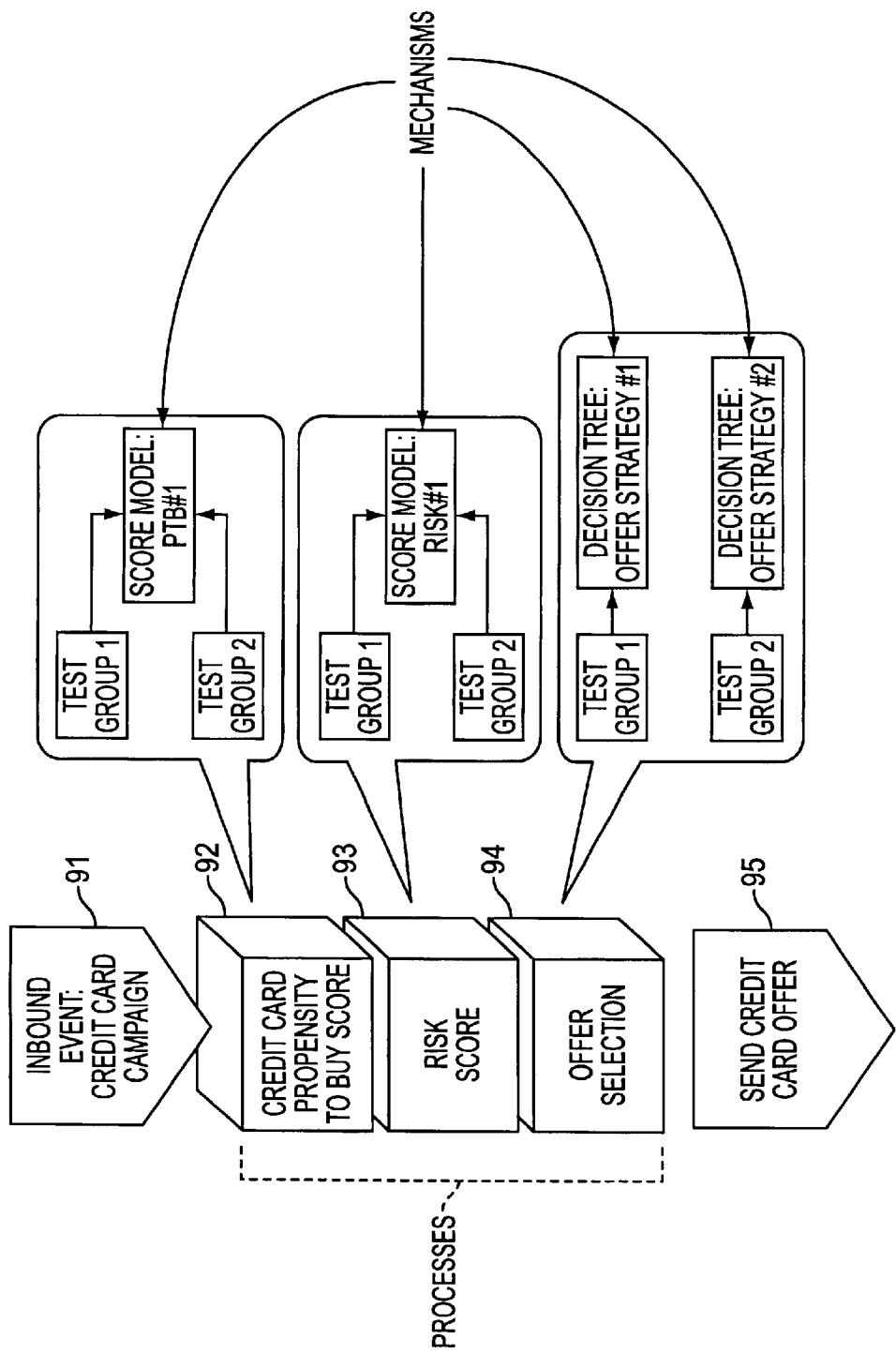
FIG. 5 (prior art) is a diagram illustrating the grouping of mechanisms to processes in a decision management system.
Figure 6:
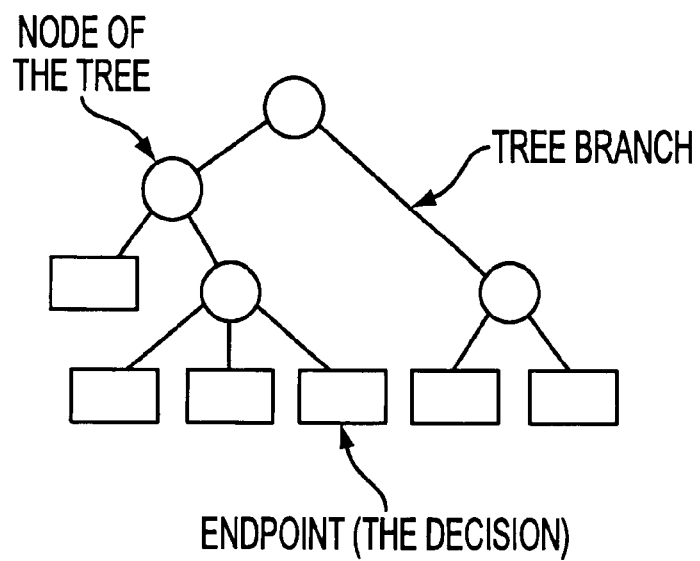
FIG. 6 (prior art) is a diagram illustrating a decision tree.

A function set is formed by one or more functions, where a function can be, for example, a decision tree, a score model, a matrix, a user exit or a list processor. Here, a function has a similar meaning as a "mechanism" described, for example, in FIG. 5, but the present invention uses a different terminology and provides the ability to store each result independently. Moreover, in the conventional system of FIG. 5, user exits and list processors were not available as mechanisms. Thus, generally, the correlation of function sets to functions is similar to that for processes to mechanisms in FIG. 5, but the terminology is different.

Figure 10:
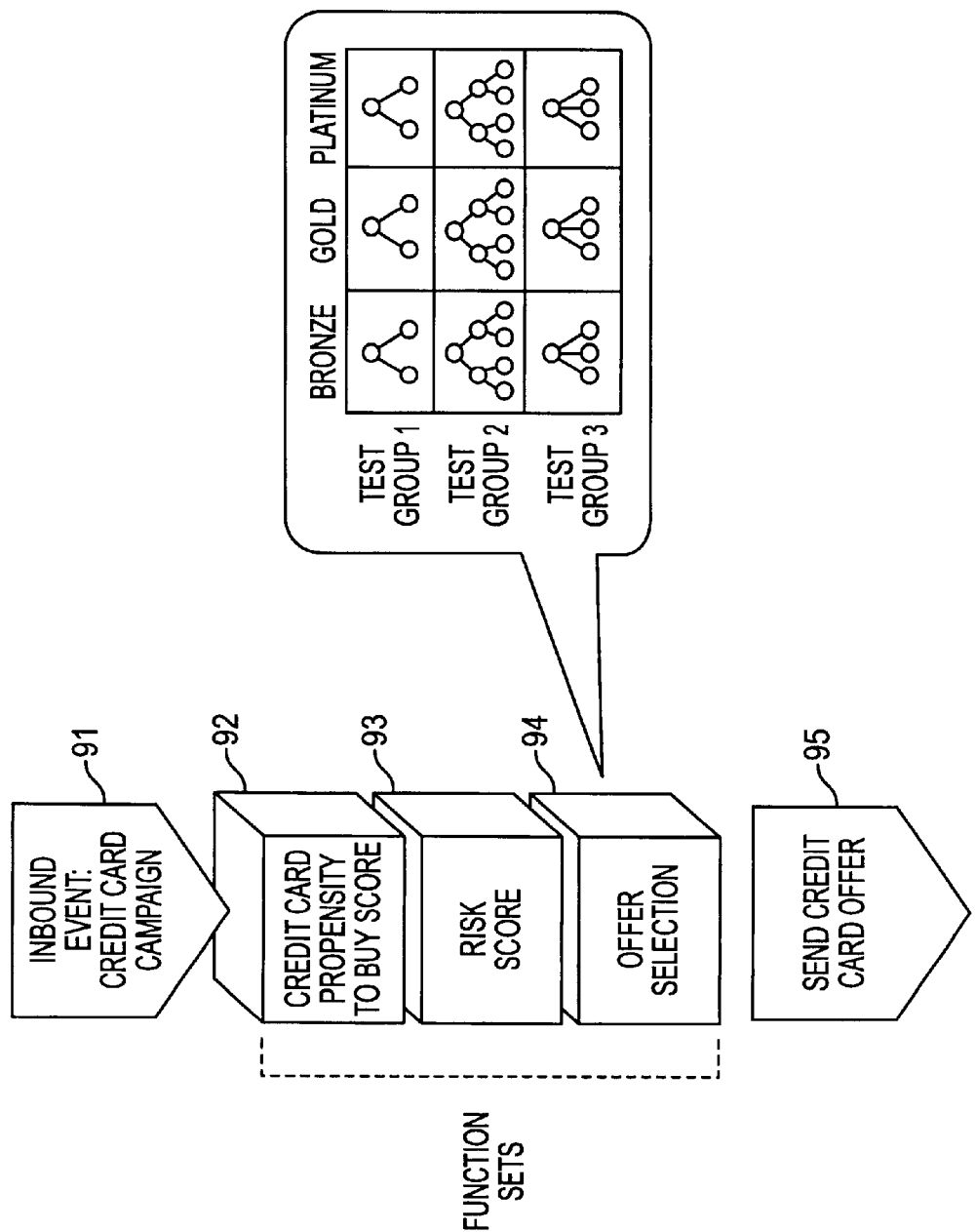
FIG. 10 is a diagram illustrating the correspondence of functions of a respective function set to strategy test cells of a matrix, according to an embodiment of the present invention.

FIG. 10 is a diagram illustrating an example of the correspondence of functions of a respective function set to the strategy test cells of the matrix, according to an embodiment of the present invention. Referring now to FIG. 10, various function sets, including credit card propensity to buy score 92, risk score 93 and offer selection 94, are executed in a user-defined order upon the occurrence of inbound event 91. Offer selection 94 includes a respective function, which is possibly a decision tree, for each strategy test cell.

Preferably, the structure of the decision tree is the same for a respective test group across each category. For example, in FIG. 10, the tree structure in the strategy test cells for test group 1 are the same for each of the Bronze, Gold and Platinum categories. Of course, the actual decisions made at each node and the branching criteria can be different. Similarly, the tree structure in the strategy test cells for test group 2 are the same for each of the Bronze, Gold and Platinum categories. This allows comparison across categories. The same principle holds across test groups for a given category.

Further, it is not necessary for a function set to have a different function for each strategy test cell. Some, or even all, of the strategy test cells for a respective function set can have the same function, depending on the level of testing which is desired to be performed. The specific design of the functions of a respective function set as they correlate to strategy test cells is a matter of design choice, thereby allowing greater flexibility in configuration of the system.

As a strategy is designed, the strategy test cells will be examined against each other. Preferably, there is a common set of metrics for the entire matrix, where the metrics are the appropriate measurements against which to measure the performance of the strategy defined for a segment. Then, it can be determined how well a test group is shifting customers to other categories. For example, it can be determined how quickly test group 1 is moving Bronze customers into the Platinum category in the matrix of FIG. 9.

Although it is preferable to create a data structure which is in "matrix" form for analyzing the movement of clients, the present invention is not intended to be limited to the use of a "matrix." Instead, any data structure which is equivalent to a matrix in providing the required functionality for defining strategy and analyzing the movement of clients will be appropriate. Therefore, generally, many different types of data structures providing an intersection between categories and test groups can be used.

As described above, once clients are placed into categories, the strategy test cells in the matrix are used to design experiments. For example, for the Bronze category, a series of experiments can be designed for each strategy test cell in that category.

In addition, as will be described in more detail below, the decision management system can measure performance so that the overall strategy can be appropriately adjusted to optimize results.

FIGS. 8–10 represent the logical flow of how strategy test cells are created, or assigned. However, the systematic or technical flow may be different. For example, the loop between steps 180 and 170 in FIG. 8 typically executes several function sets. Preferably, all non-test group specific function sets are executed first. These typically include the assessment/execution of predictive algorithms and models. Subsequently, a categorization function set can be executed, to categorize the clients. The categorization function set is generally not test group specific, but often uses the information derived from the function sets that have already been executed. Thereafter, a test cell assignment function set may be executed, to assign clients to specific test cells, or the system user may simply do this implicitly through the definition of rules.

Figure 11:
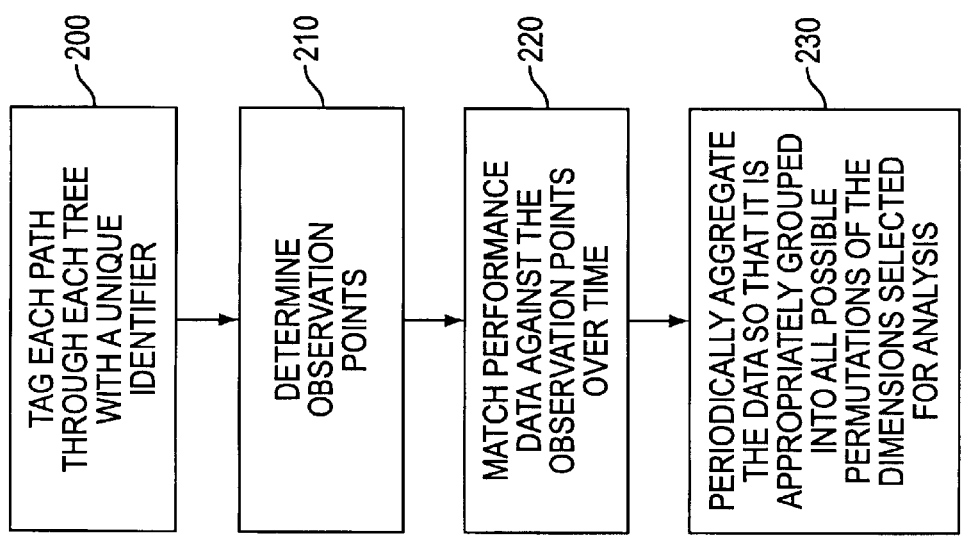
FIG. 11 is a diagram illustrating the overall operation of a decision management system for measuring performance, according to an embodiment of the present invention.

FIG. 11 is a diagram illustrating the overall operation of a decision management system for measuring performance, according to an embodiment of the present invention.

Referring now to FIG. 11, in step 200, each path through each decision tree is tagged with a unique identifier referred to as a report group. Although it is preferable to tag each path through each tree so that complex strategy can be created and refined, it is not necessary for each path to be tagged. Instead, the selection of which paths to tag is a matter of design choice, based on the strategy parameters of the decision management system.

A report group is a tag which identifies a unique path through a policy, strategy or set of rules, and is preferably, although not necessarily, applied to terminal nodes of decision trees. A report group is preferably independent of the test group, so that it can be associated with the same branch of comparable trees in two or more test groups. Report groups are a valuable strategy evolution tool, and enable comparative evaluation of strategy effectiveness for categories within a segment. Categories allow for the analysis of clients who, once being individually evaluated against user-defined criteria, are determined to have similar qualities in consideration of organizational objectives. For example, a category may be defined as all customers who have average current value, high potential value, and a low probability of attrition. Report groups can be placed throughout a decision strategy in order to assure that performance results are accumulated for each respective part of the strategy. The concept of tagging a path to measure performance, as with a report group, is known.

All clients in a given report group should be relatively homogenous, the difference being the test group to which they were randomly assigned and thus the action/decision applied to them based on their test group. Since report groups are independent of test groups, they allow for comparison of the same or alternate categories across experiments (i.e., comparison within the category Platinum of a report group for the test 1 and control test groups). Decision effectiveness reports can then track specified performance metrics (i.e., response rate for marketing, approval rate for underwriting, etc.) by test group for each report group.

A decision management system according to the embodiments of the present invention collectively uses test groups, report groups, categories and user-defined, multi-dimensional decision effectiveness reports to quickly determine the most effective strategy for each segment within a client portfolio.

Referring again to FIG. 11, from step 200 the system moves to step 210, where observation points are determined. More specifically, each time a decision is made about a client, that decision is posted. More importantly, the report group that the client passed through is posted. In addition, what segment, category, test group, etc. is posted. This is referred to as an observation point. An observation point is not intended to be limited to posting any specific criteria, so that a strategy analyst has flexibility in determining what data should be posted. Similarly, an observation point is not intended to be limited to only being triggered by decisions. For example, a score model or matrix invocation could trigger an observation.

From step 210, the system moves to step 220, where performance over time for observation points is accumulated, and matched against the observation points. Generally, an observation point is a snapshot of a point in time, and has dimensions across which analysis of the data can be performed. A specific client can have multiple observation points. Therefore, in step 210 in FIG. 11, observation points for a client are noted. Then, in step 220, for each client, performance data is matched against observation points. For example, once a month, performance data for a client may be obtained. This performance data is then matched, or correlated, to the appropriate observation points for each account and/or customer.

For example, on Jan. 1, 1998, assume that a decision is made to increase a client's credit limit by $500. This information is stored as an observation point. Data stored as part of the observation point's dimensions may be, for example, client ID, what segment the client was in, what category the client was in, what test group the client was in and what report group the client was in when that decision was made.

On Jan. 31, 1998, Feb. 31, 1998, Mar. 31, 1998, etc., some additional performance data may be obtained. For example, how much of the credit line increase was used? Did the client go delinquent on the account? What was the current value of the customer? What was their profitability? For example, over the course of a year, twelve (12) sets of performance data may be obtained for this client, each including all of these performance metrics.

Over the course of the year, other decisions may be made. For example, a mortgage offer may have been made to the client. This mortgage offer would represent a new observation point. From this time on, performance data would be accumulated for that observation point. In January, 1999, observation points made in January 1998, can possibly be rolled off, depending on the user's desired parameters dictating how long performance is to be retained. Therefore, for example, the performance of the January, 1998, credit line increase decision has been tracked for twelve months, but it will not be tracked anymore. However, performance data will still be accumulated for the observation point where the mortgage offer was made. How long to accumulate and maintain performance data for a specific observation point is a matter of design choice. Common performance data may be captured once for multiple observations.

From step 220, the system moves to step 230, where the collected performance data is periodically aggregated and grouped, preferably, into all possible permutations of the dimensions noted when the observation point was taken and selected for analysis. Generally, in step 230, it is not desirable to report on a specific client, but how well a specific test group or strategy performs. For example, the data is preferably aggregated to determine the performance of segment 1, test group 4, bronze customers, report group B. An aggregate performance data measure can then be determined for all clients meeting this criteria. In this manner, it can be evaluated how well a certain test group or category performed, instead of how well a specific client performed. Thus, strategy performance can be evaluated, instead of individual client performance.

As a result of the aggregation of data, a row of data having two parts, dimensions and metrics, can be created. Dimensions are the ways the organization wants to view the performance results. For example, segment and category would be dimensions. Aggregating the data in a row allows us to view the intersection of the different points in the matrix created in step 165 of FIG. 8. For example, by aggregating the data, we can view all the metrics, or results, associated with Bronze, test group 2. The user can interactively select which dimensions to apply in filtering the results.

Therefore, the dimensions of the rows should preferably provide all the different ways in which it is intended to analyze the performance data. The dimensions would likely include combinations that allow data relating to the category assignment matrix to be viewed, and combinations that allow data relating to specific strategy paths to be viewed.

For example, a row might include the dimensions of segment, test group, category and report group. The metrics for that row should include data relating to those dimensions, such as, for example, delinquency, % credit line used, value, profit. Therefore, by storing dimensions as a "key" to the data, a "solution set" of metrics is obtained which matches that key.

Each row can be thought of as being a unique intersection of values for all dimensional columns. Preferably, the metrics associated with those dimensions are appropriately aggregated for every possible permutation of all of the dimensions. For example, one row can include the dimensions of segment 1, test group 1, category 1, report group 1, and the aggregate results that meet these dimensions. The next row may include the dimensions of segment 1, category 1, test group 1, report group 2, and the aggregate results that meet these dimensions.

When doing the aggregation process, all possible permutations of dimensions are preferably determined. Then, the results of clients meeting these dimensions should be matched to these permutations.

For example, FIG. 12 is a diagram illustrating an example of a row of data having a dimensions part and metrics part, according to an embodiment of the present invention. Referring now to FIG. 12, each row includes the dimensions of observation time, performance time, segment, test group, category and report group. Preferably, a row is created for each possible permutation of the dimensions. The metrics of delinquency, % credit line used, value and profit are then matched to the various permutations of the dimensions. Generally, the metrics for a specific row should indicate the consolidation all the individual client data of all the individual clients meeting the values of the dimensions identifying that row. Therefore, the data for each specific client is not being reviewed, but instead the performance of a specific strategy is being reviewed.

The use of time dimensions, such as the dimensions of observation time and performance time, allows the movement between categories to be examined over time. Additionally, time allows for trend analysis and selective inclusion of performance points to access when a strategy has performed well/poorly.

Preferably, look-up tables are used for each of the dimensions, to appropriately and descriptively access the data, and to allow a system user to easily change strategy aggregation parameters which are subsequently reflected in the look-up tables.

For example, FIG. 13 is a diagram illustrating a look-up table for the test group dimension in the row illustrated in FIG. 12, according to an embodiment of the present invention. Referring now to FIG. 13, the look-up table includes a date column (DATE), a test group identifier column (TEST), and a description column (DESCRIPTION). A look-up table could be created for each of the dimensions of the row illustrated in FIG. 12.

Thus, the rows of data can be considered to be a data structure which is accessed to track the performance of a category.

Aggregation of dimensions to metrics via the use of rows, columns and look-up tables, and accessing the data as structured in a row, is preferably performed via well-known online analytical processing (OLAP) techniques and technology. Such use of OLAP techniques and technology is disclosed, for example, in related U.S. application titled USE OF ONLINE ANALYTICAL PROCESSING (OLAP) IN A RULES BASED DECISION MANAGEMENT SYSTEM, inventors Steve Campbell, Laurence Honarvar and Traci Showalter, Ser. No. 09/217,016, filed concurrently herewith, and which is incorporated herein by reference.

The aggregated data can be used to determine the effectiveness of various strategies. For example, in the above-described manner, various strategies can be tested to determine whether the strategies are successful in moving clients to more desirable categories.

Aggregate comparisons of test and control strategies can mask important differences in strategy effectiveness. For example, two strategies may appear equally effective in terms of aggregate performance while they actual outperform each other for different segments of the client portfolio. This is most easily explained by way of the hybrid approach illustrated in FIG. 7.

Figure 7:
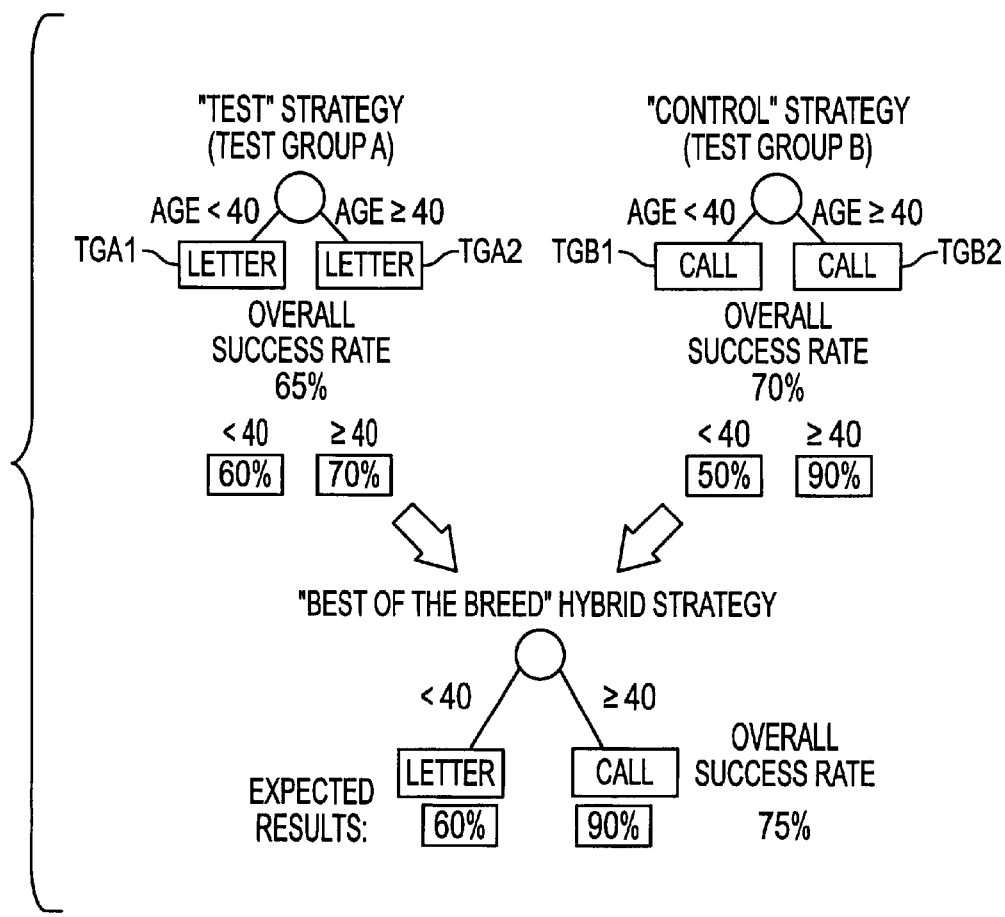
FIG. 7 (prior art) is a diagram illustrating a hybrid strategy in a decision management system.

Referring now to FIG. 7, an overall comparison of the results for the test strategy versus control strategy would indicate that the control strategy was superior (as measured by overall success rate). However, when strategy effectiveness is reported at the further segmented report group level (i.e., for each comparable path through test groups), it is possible to build a new hybrid strategy that will outperform either test or control by combining the best performing actions of each strategy.

Decision trees should preferably have the same structure for each test group, but could have different actions or decisions associated with each node. Then, a report group, because the tree structures are identical, can allow two or more identical paths to be associated with each other, independent of the test group. For example, instead of simply comparing the overall performance of test group 1 to test group 2, the same path in test group 1 can be compared to the same path in test group 2. This allows microanalysis of the strategy test cells, to determine which paths are performing very well or very poorly.

According to the above embodiments of the present invention, clients can be randomly assigned to a test group. Each test group has associated with it one or more strategies typically defined using decision trees. Each possible path through a decision tree can be "tagged" and the performance of all clients that went down that path can be monitored.

Report groups and categories can be considered to be different types of "tags." Report groups are preferable to tag paths in a single function set and provide measurement of just that path across all test groups/trees used in the respective function set. Categories provide similar functionality as report groups, but at an aggregate level. More specifically, the performance of a category is tracked as the cumulative performance of report groups assigned in strategy paths that were traversed after the assignment of the category.

Report groups define unique paths through a strategy and span test groups such that performance of path A in test group 1 can be compared with path A in test group 2. The rules associated with a given path should preferably be the same across two test groups, but the decisions assigned at the end of the path may vary by test group. As a result, the strategy experimentation function can be accelerated by not simply comparing two or more test groups to determine the best performer, but rather by measuring individual paths across two or more test groups such that a new hybrid strategy can be developed using the best performing paths of each test group.

As an example, assume that the following function sets will be executed in order: CATEGORY ASSIGNMENT, APPROVE/DECLINE DECISION, and CREDIT LIMIT ASSIGNMENT. In CATEGORY ASSIGNMENT, there are three paths used to segment customers into three categories: HIGH RISK, MEDIUM RISK and LOW RISK. Two test groups are then defined: TRADITIONAL (70%) and AGGRESSIVE (30%). The CATEGORY ASSIGNMENT tree is the same for both test groups since categories span test groups and vice-versa (i.e., a many to many relationship). However, the trees associated with the APPROVE/DECLINE and CREDIT LIMIT ASSIGNMENT function sets will have different decisions, depending on the test group.

For APPROVE/DECLINE, there are three paths through the decision tree, defined by report groups A, B and C. Similarly, there are three paths through the decision tree for CREDIT LIMIT ASSIGNMENT, defined by report groups D, E and F.

FIGS. 14(A), 14(B), 14(C) and 14(D) are diagrams illustrating the operation of a decision management system as applied to CREDIT LINE ASSIGNMENT, according to an embodiment of the present invention.

Referring now to FIGS. 14(A) and 14(B), as described above, 70% of customers are assigned to the test group TRADITIONAL, and 30% of customers are assigned to the test group AGGRESSIVE. Each test group has the same decision tree structure. There are three paths through the decision tree for CREDIT LIMIT ASSIGNMENT, defined by report groups D, E and F.

A decision management system according to the embodiment of the present invention provides the ability to measure the performance of each report group across test groups. For example, while at an aggregate level, assume that TRADITIONAL produced more profit than AGGRESSIVE. However, assume that the path/decision associated with report groups D and F in AGGRESSIVE generated more profit than the same path/decisions associated with report groups D and F in TRADITIONAL, as indicated by the "check mark" in FIG. 14(B) next to report groups D and F.

However, assume that report group E in TRADITIONAL was more profitable than the comparable paths/decision in AGGRESSIVE, as indicated by the "check mark" in FIG. 14(A) next to report group E. Rather than simply increasing the percentage of people assigned to TRADITIONAL, a new hybrid strategy can be defined and associated with a test group that uses the decision assigned for report groups D and F in AGGRESSIVE in conjunction with the decision assigned to report group E in TRADITIONAL. This new test group will be called, for example, TRADITIONAL_2. The overall profitability of TRADITIONAL_2 will be higher than either TRADITIONAL and AGGRESSIVE since it contains the best performing paths/decisions of each test group for the CREDIT LINE ASSIGNMENT function set. A similar procedure would be performed within APPROVE/DECLINE using report groups A, B and C, to develop an improved hybrid strategy for APPROVE/DECLINE.

To continue the example and relate it to categories, the performance of TRADITIONAL can be examined over time in moving more people into the LOW RISK category from the HIGH RISK category. This can be compared to the effectiveness of AGGRESSIVE at achieving the same objective (i.e., over time, moving more people into the LOW RISK category).

For example, FIGS. 14(C) and 14(D) each represent a matrix having the categories of HIGH RISK, MEDIUM RISK and LOW RISK on one axis, and the test groups TRADITIONAL and AGGRESSIVE on the other axis. Thus, these matrices have the same axes and values on the axes as the matrix in step 165 of FIG. 8. However, the matrix in step 165 in FIG. 8 is used to allocate customers to strategy test cells, whereas the matrix in FIGS. 14(C) and 14(D) are used to leverage performance metrics for each strategy test cell. More specifically, the matrices in FIGS. 14(C) and 14(D) are for viewing the movement of clients between categories. By contrast, the matrix in step 165 of FIG. 8 is for actual strategy execution versus strategy reporting.

As an example, assume that FIG. 14(C) represents a matrix based on data for January 1997, while FIG. 14(D) represents a matrix based on data for December 1997. As can be seen from comparing FIGS. 14(C) and 14(D), both test groups were effective in moving customers from the HIGH RISK category into the MEDIUM RISK and LOW RISK categories. Therefore, the company might consider permanently implementing these test group strategies. Moreover, hybrid strategies can be developed from test groups in the same category and possibly across categories. In this manner, strategies can be tested and implemented to move customers appropriately into different categories. The effectiveness measurement of the categories is a direct function of aggregating the performance associated with the report groups assigned to the clients for the APPROVE DECLINE and/or CREDIT LIMIT ASSIGNMENT function sets.

The various processes, procedures, methods and operations described herein are preferably embodied in software, which can be run on many different hardware configurations.

Figure 15:
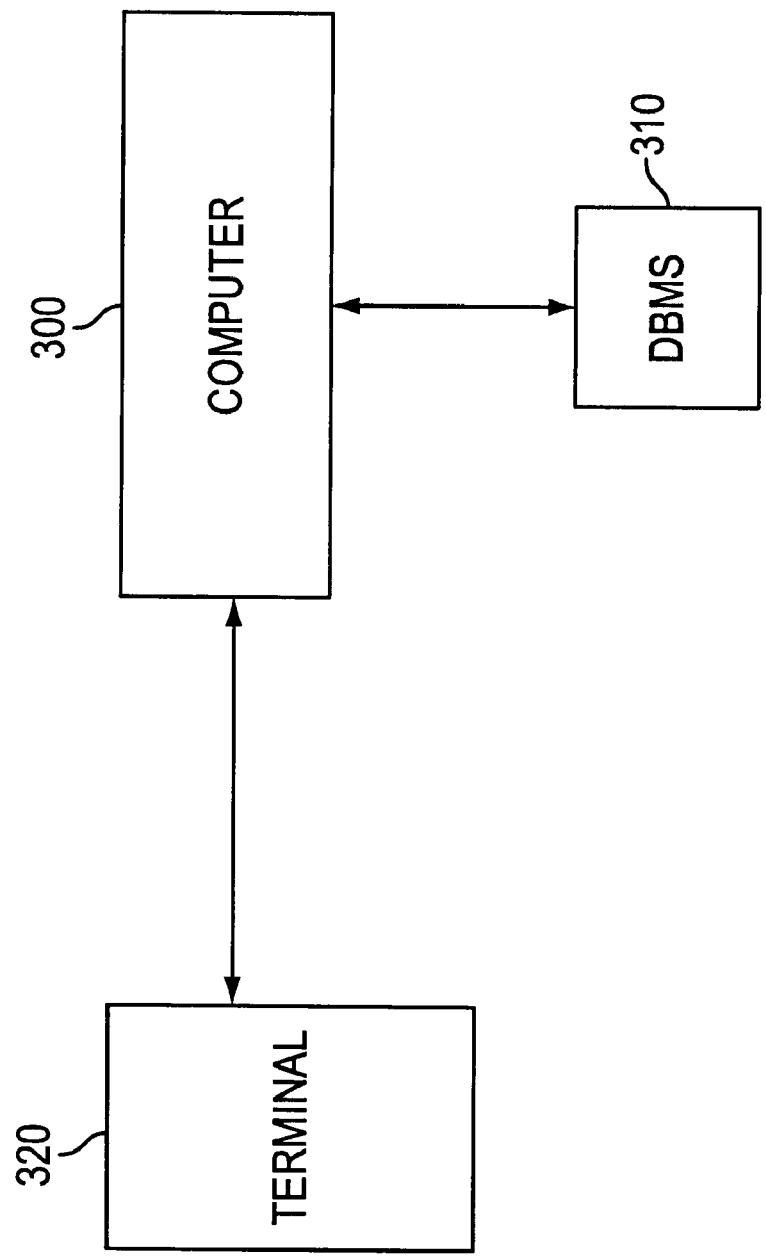
FIG. 15 is a diagram illustrating a simplified hardware architecture of a decision management system, according to an embodiment of the present invention.

FIG. 15 is a diagram illustrating a simplified hardware architecture of a decision management system, according to an embodiment of the present invention. Referring now to FIG. 15, the decision management system is embodied in software stored in a computer-readable medium, such as a memory of a computer 300. Computer 300 can be, for example, a server and associated memory. Computer 300 preferably has access to a data base management system (DBMS) 310 for storing and accessing accumulated data. A user accesses computer 300 possibly via a terminal 320 which can be, for example, a PC. There are many different types of hardware configurations, including many different types of client/server architectures, which can be used. Such hardware configurations would be understood by a person of skill in the art.

Figure 16:
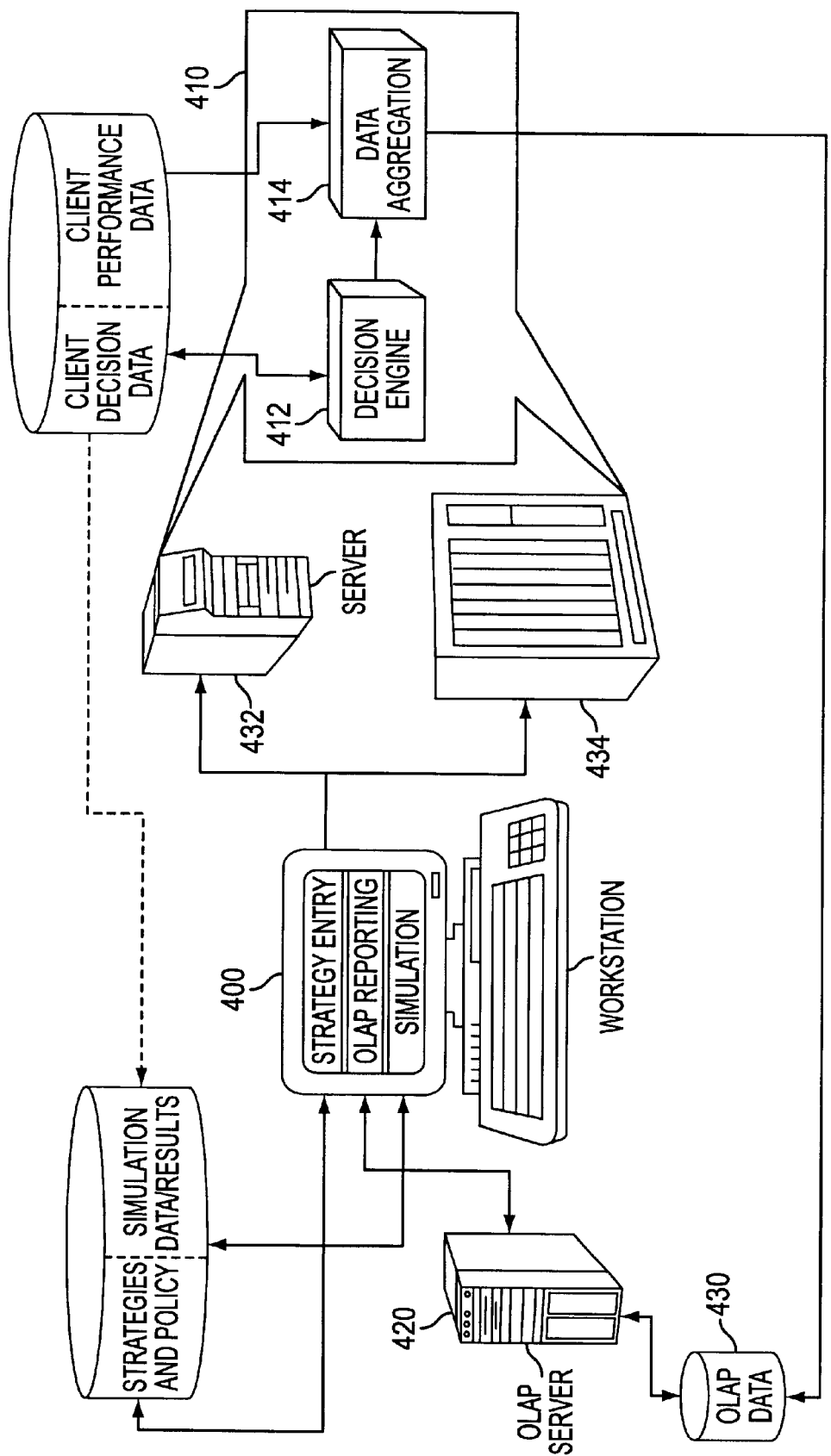
FIG. 16 is a diagram illustrating a more detailed hardware architecture of a decision management system, according to an embodiment of the present invention.

FIG. 16 is a diagram illustrating a more detailed hardware architecture of a decision management system, according to an embodiment of the present invention. Referring now to FIG. 16, a workstation 400 provides a centralized user interface through which a strategy analyst can control the system. The primary purpose of workstation 400 is to enable the entry, maintenance and propagation of decision strategies to a decision engine/data aggregation platform 410 which includes a decision engine 412 and a data aggregation component 414. Workstation 400 also provides access to OLAP analysis and reporting systems via an OLAP server 420 and OLAP database 430. A server 432 and a mainframe 434 typically run different processing modes, and provide the processing power for decision engine/data aggregation platform 410.

Decision engine 412 deploys the business decisioning rules entered on workstation 400 against client data. This architecture is highly scaleable and can operate in both on-request or batch processing modes as well as on both mainframe and client/server environments.

Potentially sharing the same environments as decision engine 412 is data aggregation component 414. Data aggregation component 414 is responsible for matching/merging decision engine output (i.e., scores and decisions) with the results of enacting recommendations of decision engine 412. Data aggregation component 414 provides the information that OLAP server 420 accesses to provide strategy performance.

The OLAP portion of the system preferably uses a one to four tier architecture to allow a strategy analyst to do multidimensional analysis on the results of deployed strategies. The OLAP portion of the system can be extremely scaleable through leveraging the following configurations: data resides locally with a graphical reporting user interface (1 tier), data resides independently from the graphical reporting user interface (2 tiers), a server resides between the user interface and the data to expedite query requests and monitor strategy results (3 tiers) and/or a web server resides between the user interface and the OLAP server to enable mass browser-based distribution of reports (4 tiers). OLAP's multidimensional qualities provides analysts with the flexibility to "mine" their results, examining relationships in the data as well as the ability to perform ad hoc calculations and re-format views as required.

A decision management system is described above as being embodied, for example, in software stored in a computer-readable medium, such as a memory of a computer. However, a computer-readable medium is not intended to be limited to a memory of a computer. Instead, a computer-readable medium can be, for example, a computer disk, an optical disk or any other medium which is readable by a computer.

According to the above embodiments of the present invention, a decision management method and apparatus (a) assigns clients of an organization into categories and test groups so that the clients are conceptually representable in a data structure equivalent to a matrix having first and second axes with the categories on the first axis and the test groups on the second axis, the intersection of each category and test group in the matrix defining a test cell; (b) applies different strategies to clients within different test cells; and (c) tracks the movement of clients between categories as a result of the applied strategies.

As indicated above, the clients are "conceptually representable" in a data structure equivalent to a matrix. Thus, it is not necessary to physically create a matrix. Instead, the strategies should simply be applied to the clients in a manner which corresponds to that "conceptualized" by the matrix.

The test groups and categories are not intended to be limited to the specific examples included herein, and instead can be flexibly designed, for example, based on the business of the organization. For example, Bronze, Gold and Platinum are described herein as being categories. However, the present invention is not intended to be limited to use with these specific category names. Moreover, the applied strategies are not intended to be limited to any specific decision tree structure described herein as an example.

A decision management system according to the above embodiments of the present invention allows strategies to be developed which move clients of an organization from one category of clients to another. Different strategies are applied to clients within different strategy test cells. Then, the movement of clients between strategy test cells can be monitored, so that the strategies can be appropriately modified to control the movement of clients between categories.

The present invention is not intended to be limited to controlling the movement of clients across categories, and movement is not the only reason to apply strategies. Instead, strategies can be applied, for example, simply to increase the client value over time to the organization. For example, two distinct report groups may result in different delinquency rates for clients of a company. Changing the overall strategy to include the strategy which yields the lower delinquency rate does not necessarily imply movement of a client across client categories. The client may stay, for example, in a "Bronze" category, but the overall effectiveness of the portfolio of clients may have been statistically improved. Therefore, in this example, the client value over time to the company has been increased.

A decision management system according to the above embodiments of the present invention is significantly different and more evolved than the system described in FIGS. 1–7. For example, the system described in FIGS. 1–7 does not create or conceptualize a data structure equivalent to a matrix of categories and test groups, and thereby does not allow different strategies to be applied to different strategy test cells of the matrix. Further, a system as described in FIGS. 1–7 does not track movement of clients between categories, or modify strategies based on the tracked movement to control movement of clients between categories. In addition, a system as described in FIGS. 1–7 has no OLAP capability to perform multidimensional analysis on strategy results and thus explain positive/negative strategy performance. Therefore, a system as in FIGS. 1–7 cannot provide advantages of the present invention. Instead, it is limited to very tactical analysis.

Referring to FIG. 8, step 140 as performed by a computer (such as computer 300 in FIG. 15) can be considered to be a inbound event receiving device which receives an inbound event. Step 150 as performed by a computer can be considered to be a segment assigning device which assigns clients to different segments. Step 155 as performed by a computer can be considered to be a category assigning device which assigns clients into different categories. Step 160 as performed by a computer can be considered to be a test group assigning device which assigns clients to different test groups. Step 165 as performed by a computer can be considered to be a matrix creating device, or a test cell assignment device, which creates a matrix-equivalent structure, or simply allows clients to be conceptually representable in a data structure equivalent to a matrix so that clients can be assigned to test cells. Step 170 as performed by a computer can be considered to be a matching device which matches inbound events to function sets. Step 180 as performed by a computer can be considered to be an execution device which executes function sets. Step 190 as performed by a computer can be considered to be a result performing device which outputs, or performs, results.

Similarly, steps 155, 160 and 165, taken together and as performed by a computer, can be considered to be a data structuring device which, in effect, assigns clients into categories and test groups so that clients are conceptually representable in a data structure equivalent to a matrix having categories and test groups as its axes, with the intersection of each category and test group in the matrix defining a strategy test cell. Steps 170 and 180, taken together and as performed by a computer, can be considered to be a strategy device which applies different strategies to clients within different strategy test cells. Similarly, the operation in FIG. 11, as performed by a computer, can be considered to be a tracking device which tracks the movement of clients between categories.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A decision management process comprising:

applying, by a computer, different strategies to different categories of clients of an organization;

tracking, by a computer, movement of clients between categories as a result of the applied strategies; and refining, by a computer, the applied strategies based on the tracked movement to control the movement of clients between categories and thereby increase client value over time to the organization, wherein said applying different strategies comprises assigning the clients into categories and test groups so that clients are conceptually representable in a data structure equivalent to a matrix having first and second axes with the categories on the first axis and the test groups on the second axis, the intersection of each category and test group in the matrix defining a test cell, and applying different strategies to clients within different test cells.

2. A decision management process comprising:

applying, by a computer, different strategies to different categories of clients of an organization;

tracking, by a computer, performance of the clients as a result of the applied strategies; and refining, by a computer, the applied strategies based on the tracked performance to control movement of clients between categories and thereby increase client value over time to the organization, wherein said applying different strategies comprises assigning the clients into categories and test groups so that clients are conceptually representable in a data structure equivalent to a matrix having first and second axes with the categories on the first axis and the test groups on the second axis, the intersection of each category and test group in the matrix defining a test cell, and applying different strategies to clients within different test cells.

3. A decision management process as in claim 2, wherein said refining refines strategies applied to clients in individual test cells, to control movement of the clients between categories.

4. A decision management process as in claim 3, wherein strategies are based on decision tree structures and, for a respective test group, strategies having the same decision tree structure are applied to the test cells for that test group across each category.

5. A decision management process as in claim 2, wherein strategies are based on decision tree structures and, for a respective test group, strategies having the same decision tree structure are applied to the test cells for that test group across each category.

6. A decision management process as in claim 2, wherein strategies applied to test cells are based on decision tree structures, the process further comprising:

creating a hybrid strategy for a respective category by combining paths of decision tree structures of different strategies applied to clients within different test cells for that category.

7. A decision management process as in claim 2, wherein each strategy is based on a decision tree structure, and said tracking performance comprises:

tagging paths through decision tree structures with tags that measure performance of the tagged path and that span test groups so that paths through different strategies applied to clients within different test cells for different test groups can be compared;

monitoring the tagged paths via the tags to track performance of clients that travelled the tagged paths; and tracking performance of a category as the cumulative performance of the clients that travelled the tagged paths in that category.

8. A decision management process as in claim 7, further comprising:

creating a hybrid strategy for a respective category using the best performing individual tagged paths across at least two test groups.

9. A decision management process as in claim 7, wherein said tracking performance of the clients further comprises:

forming a data structure conceptually representable as rows, each row including a different combination of dimensions than the other rows and including accumulated performance data corresponding to the combination of dimensions of the row; and accessing the data structure to track performance of a category.

10. A decision management process as in claim 7, wherein said tracking performance of the clients further comprises:

tracking the movement of clients between test cells within categories of the matrix over time.

11. A decision management process as in claim 2, wherein said tracking performance comprises:

tracking the movement of clients between test cells in different categories of the matrix over time.

12. A decision management process as in claim 2, wherein said tracking performance comprises:

tracking the movement of clients between categories for each test group as a result of the applied strategies.

13. A decision management process as in claim 2, further comprising:

defining the categories by users of the process so that different users can define different categories.

14. A decision management process comprising:

assigning clients of an organization into categories and test groups so that clients are conceptually representable in a data structure equivalent to a matrix having first and second axes with the categories on the first axis and the test groups on the second axis, the intersection of each category and test group in the matrix defining a test cell;

applying different strategies to clients within different test cells, strategies being based on decision tree structures and, for a respective test group, strategies having the same decision tree structure being applied to clients in the test cells for that test group across each category;

tagging paths through decision tree structures with tags that measure performance of the tagged path and that span test groups so that paths through different strategies applied to clients within different test cells for different test groups can be compared;

monitoring the tagged paths via the tags to track performance of clients that travelled the tagged paths;

tracking performance of a category as the cumulative performance of the clients that travelled the tagged paths in that category; and refining strategies applied to clients in individual test cells based on the tracked performance, to control the movement of clients between categories.

15. A decision management process as in claim 14, further comprising:

defining the categories by users of the process so that different users can define different categories.

16. A decision management apparatus comprising:

means for assigning clients of an organization into categories and test groups so that clients are conceptually representable in a data structure equivalent to a matrix having first and second axes with the categories on the first axis and the test groups on the second axis, the intersection of each category and test group in the matrix defining a test cell;

means for applying different strategies to clients within different test cells;

means for tracking performance of the clients as a result of the applied strategies; and means for refining strategies applied to clients in individual test cells based on the tracked performance to control movement of clients between categories and thereby, to increase client value over time to the organization.

17. A decision management apparatus as in claim 16, further comprising:

means for defining the categories by users of the apparatus so that different users can define different categories.

18. A decision management apparatus comprising:

a data structuring device assigning clients of an organization into categories and test groups so that clients are conceptually representable in a data structure equivalent to a matrix having first and second axes with the categories on the first axis and the test groups on the second axis, the intersection of each category and test group in the matrix defining a test cell;

a strategy device applying different strategies to clients within different test cells;

a tracking device tracking the movement of clients between categories as a result of the applied strategies; and a refining device refining strategies applied to clients in individual test cells based on the tracked movement.

19. A decision management apparatus as in claim 18, further comprising:

a category defining device allowing users of the apparatus to define the categories so that different users can define different categories.

20. A computer readable storage medium including a process:
  applying different strategies to different categories of clients of an organization;
  tracking performance of the clients as a result of the applied strategies; and
  refining the applied strategies based on the tracked performance to control movement of clients between categories and thereby increase client value over time to the organization.

21. A computer readable storage medium as in claim 20, further including a process:
  defining the categories by a user of the computer readable storage medium so that different users can define different categories.

22. A method comprising:
  assigning clients of an organization into categories and test groups so that clients are conceptually representable in a data structure equivalent to a matrix having first and second axes with the categories on the first axis and the test groups on the second axis, the intersection of each category and test group in the matrix defining a test cell;
  applying, by a computer, different strategies to clients within different test cells;
  tracking, by a computer, the movement of clients between categories as a result of the applied strategies; and
  refining strategies applied to clients in individual test cells based on the tracked movement, to control movement of clients between categories.

23. An apparatus comprising:
  means for assigning clients of an organization into categories and test groups so that clients are conceptually representable in a data structure equivalent to a matrix having first and second axes with the categories on the first axis and the test groups on the second axis, the intersection of each category and test group in the matrix defining a test cell;
  means for applying different strategies to clients within different test cells;
  means for tracking the movement of clients between categories as a result of the applied strategies; and
  means for refining strategies applied to clients in individual test cells based on the tracked movement, to control movement of clients between categories.

* * * * *